United States Patent
Grobis et al.

(10) Patent No.: US 8,786,985 B1
(45) Date of Patent: Jul. 22, 2014

(54) SYSTEM, METHOD AND APPARATUS FOR STORAGE ARCHITECTURE FOR BIT PATTERNED MEDIA USING BOTH ERASE BAND AND SHINGLED MAGNETIC RECORDING

(71) Applicant: HGST Netherlands B.V., Amsterdam (NL)

(72) Inventors: Michael K. Grobis, San Jose, CA (US); Hans J. Richter, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/854,621

(22) Filed: Apr. 1, 2013

Related U.S. Application Data

(62) Division of application No. 12/912,324, filed on Oct. 26, 2010, now Pat. No. 8,432,633.

(51) Int. Cl.
*G11B 5/39* (2006.01)

(52) U.S. Cl.
USPC .......................................................... 360/135

(58) Field of Classification Search
USPC .......................................................... 360/135
See application file for complete search history.

(56) References Cited

U.S. PATENT DOCUMENTS

| | | | |
|---|---|---|---|
| 6,377,413 B1 * | 4/2002 | Sacks et al. ..................... 360/48 |
| 7,133,241 B2 | 11/2006 | Che et al. |
| 7,242,550 B2 | 7/2007 | Hara et al. |
| 7,317,596 B2 | 1/2008 | Albrecht et al. |
| 7,372,656 B2 | 5/2008 | Satoh et al. |
| 7,408,731 B2 | 8/2008 | Uemura et al. |
| 7,417,821 B2 | 8/2008 | Tsuchinaga |
| 7,490,212 B2 | 2/2009 | Kasiraj et al. |
| 7,570,448 B2 | 8/2009 | Yamagishi |
| 7,835,094 B2 * | 11/2010 | Bedillion ........................ 360/29 |
| 8,665,549 B2 * | 3/2014 | Albrecht et al. ................ 360/75 |
| 2002/0071198 A1 | 6/2002 | Liu et al. |
| 2008/0204915 A1 | 8/2008 | Albrecht et al. |

FOREIGN PATENT DOCUMENTS

JP 2007073116 3/2007

* cited by examiner

*Primary Examiner* — Mark Blouin

(57) ABSTRACT

Storage architecture for bit patterned media uses both erase band and shingled magnetic recording. A hard disk drive may comprise a disk having bit patterned media with a plurality of data tracks arrayed in architecture pages having at least one of erase band mode (EBM), shingled mode (SM) and unallocated space. An actuator has a head for writing data to the data tracks of the bit patterned media. A control system monitors, reallocates and reconfigures the architecture pages from EBM, SM or unallocated space to a different one of EBM, SM or unallocated space to enhance performance of the hard disk drive.

15 Claims, 7 Drawing Sheets

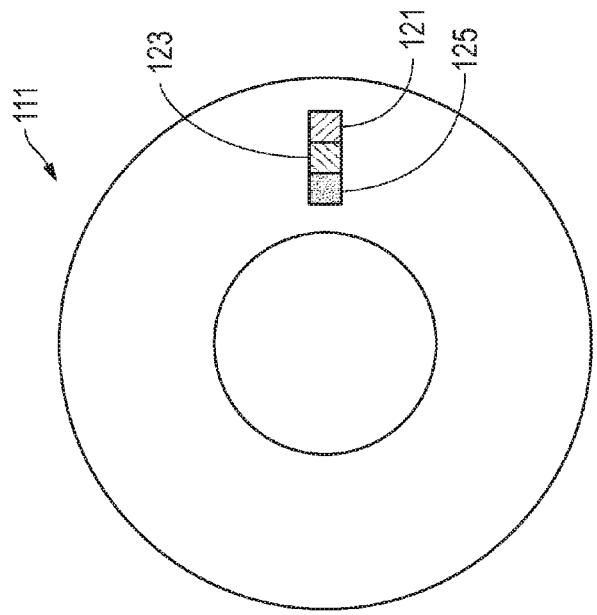
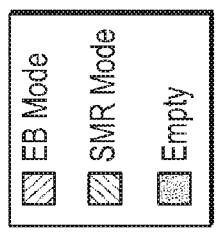
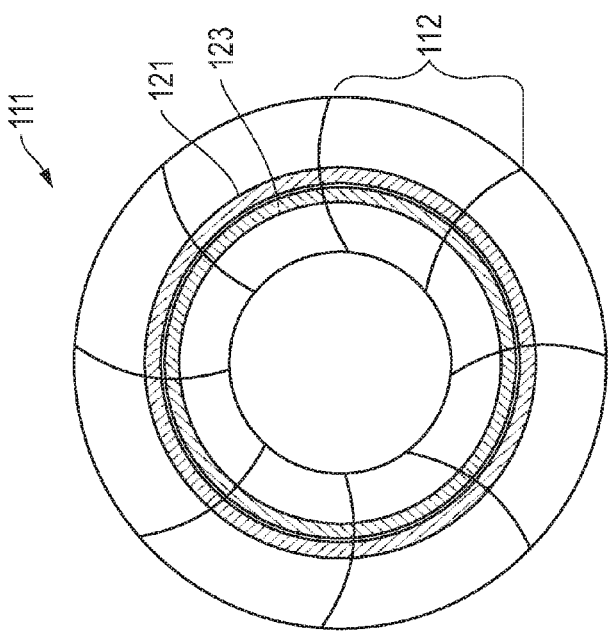
FIG. 1B
FIG. 1A

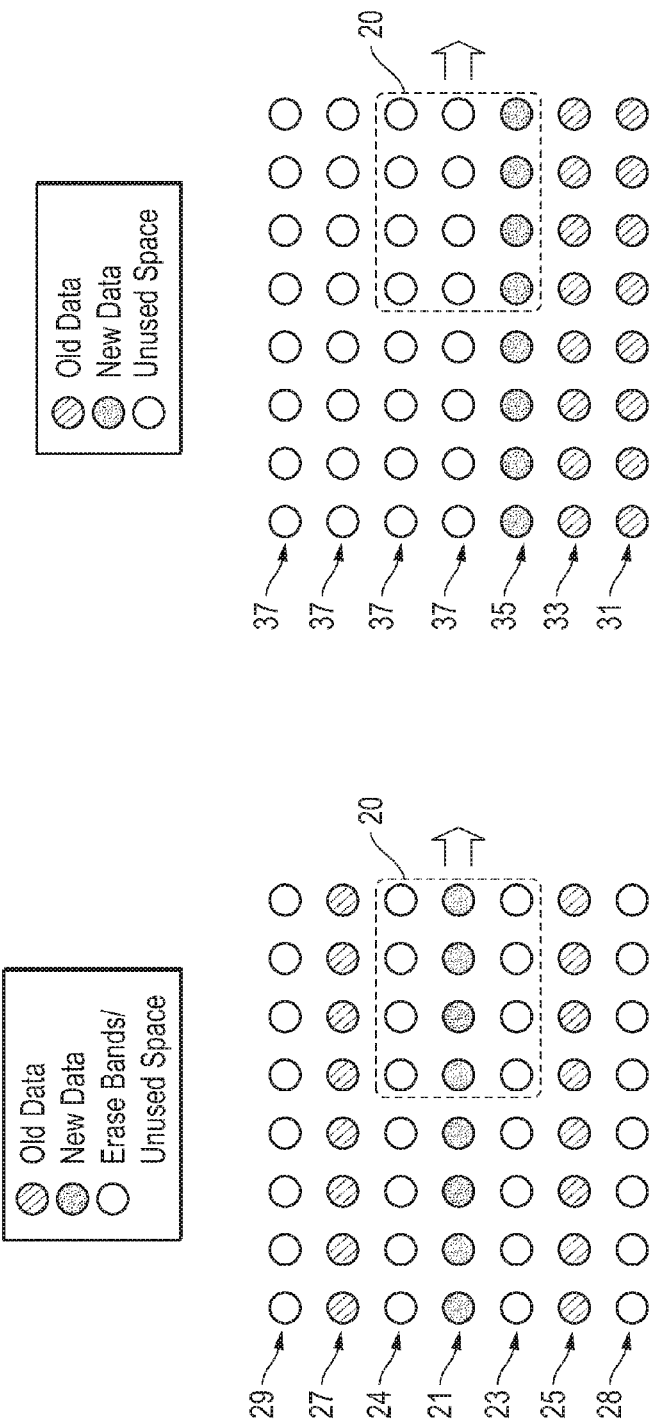

SYSTEM, METHOD AND APPARATUS FOR STORAGE ARCHITECTURE FOR BIT PATTERNED MEDIA USING BOTH ERASE BAND AND SHINGLED MAGNETIC RECORDING

This application is a Divisional of U.S. Utility patent application Ser. No. 12/912,324, filed Oct. 26, 2010, which is incorporated herein by reference in its entirety.

BACKGROUND OF THE INVENTION

1. Field of the Disclosure

This invention generally relates to hard disk drives and, in particular to an improved system, method and apparatus for storage architecture for bit patterned media using both erase band and shingled magnetic recording.

2. Description of the Related Art

Organizing and storing physical data on bit patterned media (BPM) is a promising candidate for magnetic data storage that exceeds 1 Tb/in². Due to fabrication constraints, high density BPM will most likely employ data cells that have a bit aspect ratio (BAR) of 1 to 2. Low BARs pose a challenge to head design, which favors high BAR. Heads that have the necessary write fields and write field gradients to write data to BPM with high fidelity tend to write multiple tracks simultaneously. These types of heads, however, erase any data than might have been stored on an adjacent track. The BAR mismatch problem can be solved by using shingled magnetic recording (SMR). SMR, however, adds complexity and delays to the recording process. A data storage architecture that reduces the loss in performance associated with SMR would be desirable.

SUMMARY

Embodiments of a system, method and apparatus for storage architecture for bit patterned media using both erase band and shingled magnetic recording are disclosed. A hard disk drive may comprise a disk having bit patterned media with a plurality of data tracks arrayed in architecture pages having at least one of erase band mode (EBM), shingled mode (SM) and unallocated space. An actuator has a head for writing data to the data tracks of the bit patterned media. A control system monitors, reallocates and reconfigures the architecture pages from EBM, SM or unallocated space to a different one of EBM, SM or unallocated space to enhance performance of the hard disk drive.

In other embodiments, a method of partitioning data tracks on a disk of bit patterned media in a hard disk drive comprises providing the disk with pages having a storage architecture of at least one of erase band mode (EBM), shingled mode (SM) and empty space; counting an amount of empty space and a number of EBM pages; assessing if the amount of empty space is above a selected threshold and, if so, assessing if any SM pages can be converted to EBM pages; converting SM pages to EBM pages; updating a status of converted pages and mapping between a user data location and a physical data location before returning to the counting step; determining if the number of EBM pages is sufficient to allow consolidation if the amount of empty space is not above the selected threshold; consolidating SM pages and returning to the updating step; consolidating the EBM pages into SM pages if the number of EBM pages is sufficient to allow consolidation; and returning to the updating step.

In another embodiment, a method of partitioning data tracks on a disk of bit patterned media in a hard disk drive comprises organizing the disk into pages of adjacent data tracks spanning one or more sectors; partitioning the pages into storage architectures comprising erase band mode (EBM), shingled mode (SM) and empty space; monitoring whether the pages are being written to in EBM, SM, or are empty pages; changing the storage architecture of at least one page based on how much empty space remains in said at least one page; converting EBM pages to SM pages when a storage threshold is exceeded; and transferring valid user data from EBM pages to SM pages or to empty pages that have been converted to SM pages.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIGS. 1A and 1B are schematic drawings of embodiments of a disk with page layouts and states;

FIGS. 3A and 3B are schematic views of embodiments of data tracks for data storage;

The use of the same reference symbols in different drawings indicates similar or identical items.

DETAILED DESCRIPTION

Figure 2:
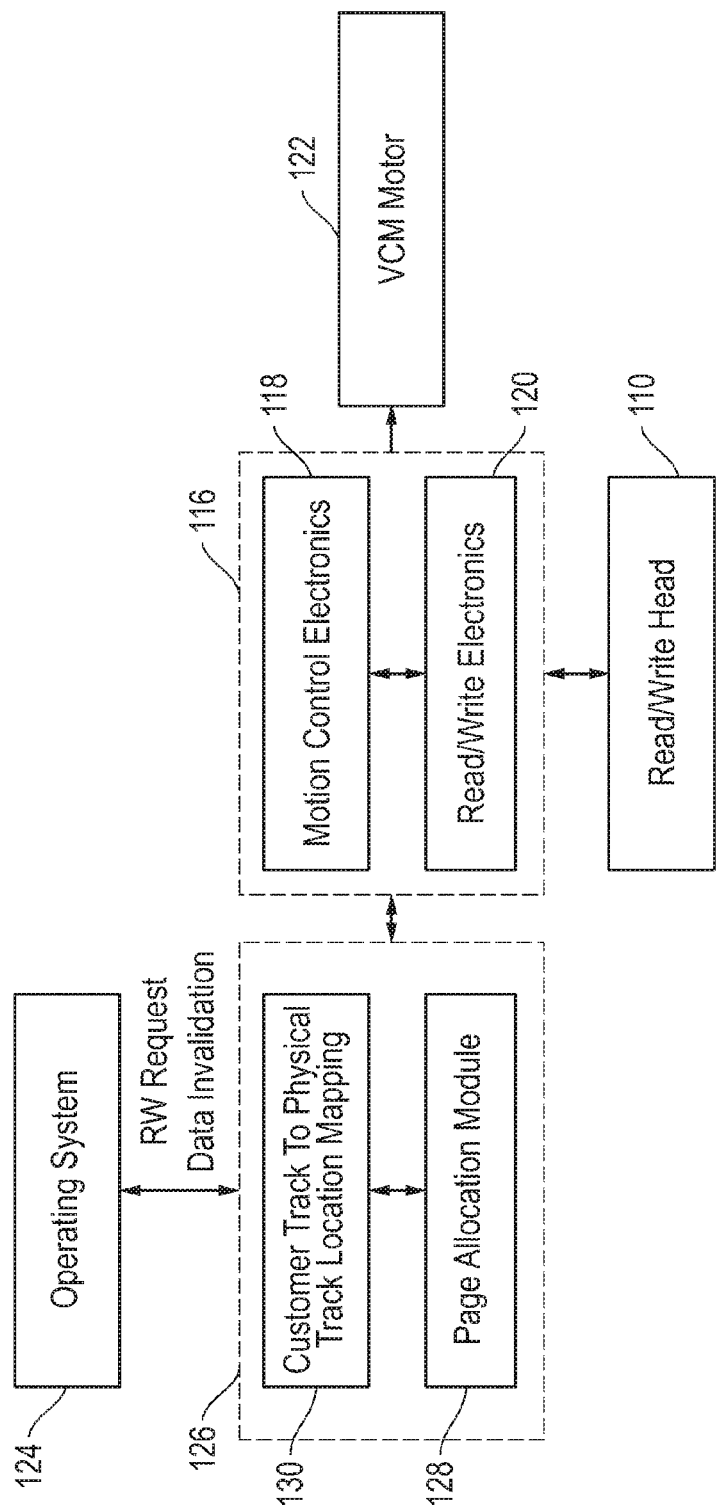
FIG. 2 is a schematic drawing of an embodiment of disk drive control system.

FIGS. 1-7 disclose embodiments of a system, method and apparatus for storage architecture for bit patterned media using both erase band and shingled magnetic recording. The data storage architecture writes and stores data on a bit patterned media disk in which the write width of the write head may span two or more tracks. The wide write head can write each of the written tracks with high fidelity, though with duplicate data in some embodiments. Embodiments for the patterned islands of media are collectively arrayed in rectangular, staggered, parallelogram and other lattices.

The data may be recorded or written using one of two techniques, including an erase band mode (EBM) and a shingled mode (SM). Data storage regions on the disk (e.g., tracks and sectors) may be grouped into units or pages. For example, FIG. 1A illustrates a disk 111 having data sectors in between servo sections 112 with an EBM page 121 and a SM page 123. Each of these data storage regions is arranged in a circumferential band around the disk. Each page comprises a group of adjacent tracks within a sector 112 or groups of sectors 112 on the disk 111. Though FIG. 1A shows each page extending around the entire disk, the grouping of tracks into pages may be performed in many different ways. As depicted in FIG. 1B, the pages may comprise smaller groupings of tracks even within a data sector. The disk drive monitors whether a page is being used for a state of EBM writing 121, SM writing 123, or is an empty, unallocated page 125. The designation of a page to either EBM or SM is not fixed and can be changed. For example, the pages may be switched by considering how much free space remains in each type of page.

For example, FIG. 2 depicts a high level schematic diagram of an embodiment of drive electronics for monitoring the allocation of pages. Control circuitry 116 includes motion control electronics 118 and read/write electronics 120 for operating voice coil motor (VCM) 122 and read/write head 110, respectively. Operating system 124 communicates read/write requests and data validation/invalidation to a page tracking module 126, which also communicates with control circuitry 116. In some embodiments, page tracking module 126 provides a page allocation module 128, and customer track to physical track location mapping 130.

In EBM, data is stored only on tracks that are located at least a write width apart so that they are not corrupted when nearby data tracks are written. The tracks located between the designated data tracks form 'permanent' unused spaces or "erase bands" and are re-written every time an adjacent data track is written to.

With SM or the second type of write mode, every track may be used to store data and are written using shingling magnetic recording. In SM, groups of adjacent tracks are written in successive passes with the head translated by one physical track width after each pass. See, e.g., U.S. Pat. App. Pub. 2002/0071198, which is incorporated herein by reference in its entirety.

Reconfiguring a page from EBM to SM causes the erase bands of EBM to become usable data storage tracks in SM. Similarly, changing a page from SM to EBM reduces half of the data tracks to erase bands. Thus, while EBM allows for quicker writing and simpler storage architecture, it has a lower effective storage density than SM. To improve performance, the disk drive may dynamically allocate the partitioning of physical storage space into either EBM or SM.

For example, the storage architecture may be employed in a head-media system in which the write head writes three tracks simultaneously, with a bit aspect ratio or BAR of about 1 to 2. The extension of this example to systems in which the write width writes any number of multiple tracks and arbitrary BAR follows easily from this example.

Referring to FIGS. 3A and 3B, embodiments of the two write modes (i.e., EBM and SM, respectively) are depicted for writing user data to the physical bits or islands on a magnetic media disk in a hard disk drive using an exemplary three-track wide write head 20. Again, heads having different widths are equally suitable. Head 20 moves left to right in a longitudinal direction, as indicated by the arrow. In EBM, there are two types of tracks of islands formed in an alternating pattern: data tracks 21, 25, 27, and erase bands or tracks 23, 24, 28, 29. User data is stored only in the data tracks. The tracks immediately adjacent to or in between the data tracks are unused space and denoted as the erase bands. For example, the two adjacent erase bands 23, 24 on the lateral sides of the "new data" user data track 21 are overwritten every time data is written to data track 21. Also shown are data tracks 25, 27 wherein data was previously written. These data tracks 25, 27 may be referred to as storing 'old data.' Data track 25 has adjacent erase bands 23, 28, while data track 27 has adjacent erase bands 24, 29. The EBM architecture has the disadvantage of reducing the effective storage area by about half, but suffers no performance loss in comparison to SM.

In the embodiment of SM depicted in FIG. 3B, data is written to every physical track in a shingled fashion. Thus, SM has no erase bands but only unused space. For example, the user data is written starting with the bottom track 31 and successively to each adjacent track from bottom to top. In the illustrated embodiment, data tracks 31, 33 were written to prior to track 35, which represents 'new data.' Tracks 37 are merely unused space that has not yet been written to in SM. In addition, the position of the head 20 with respect to the track centers may need to be adjusted slightly between the SM and EBM write modes.

Figures 4A, 4B:
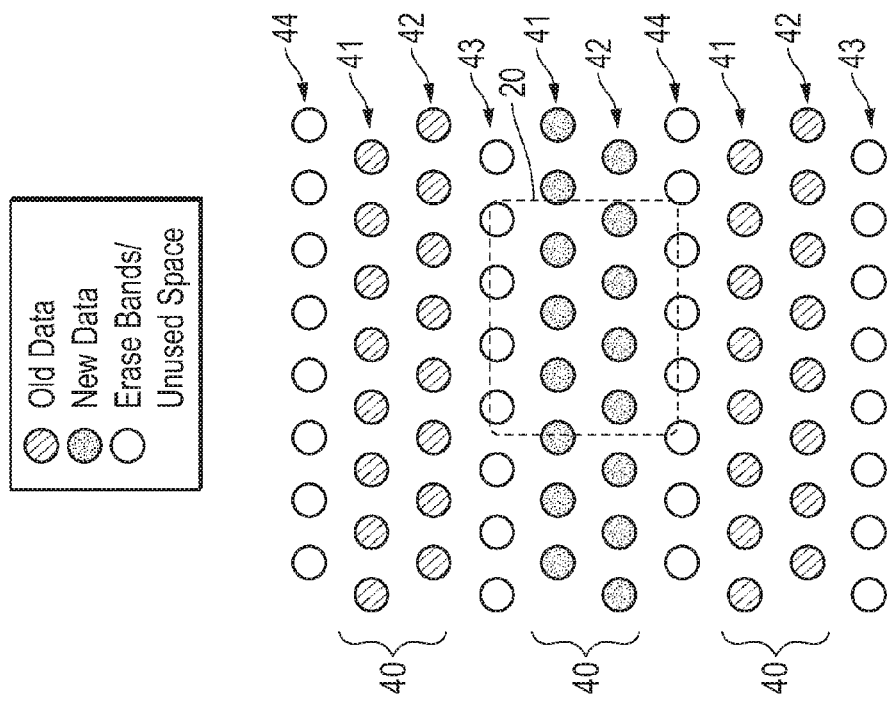
FIGS. 4A and 4B are schematic views of other embodiments of data tracks for data storage.
Figure 5B:
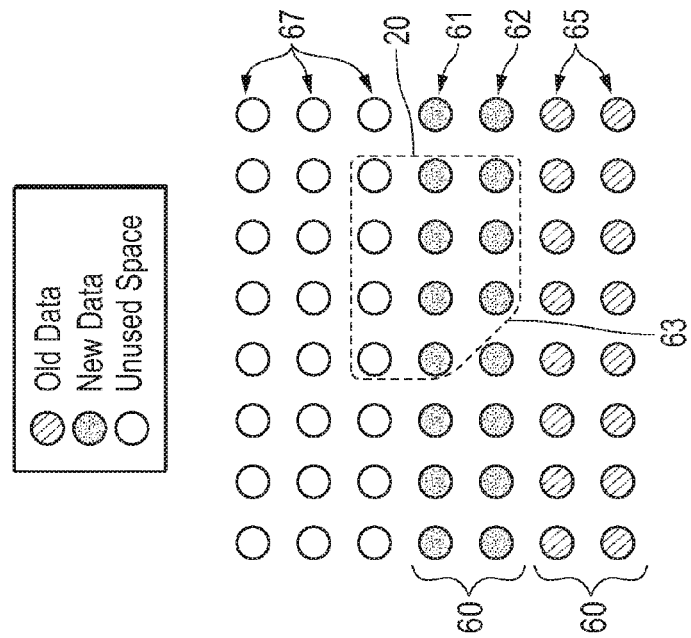
FIGS. 5A and 5B are schematic views of still other embodiments of data tracks for data storage.
Figure 5A:
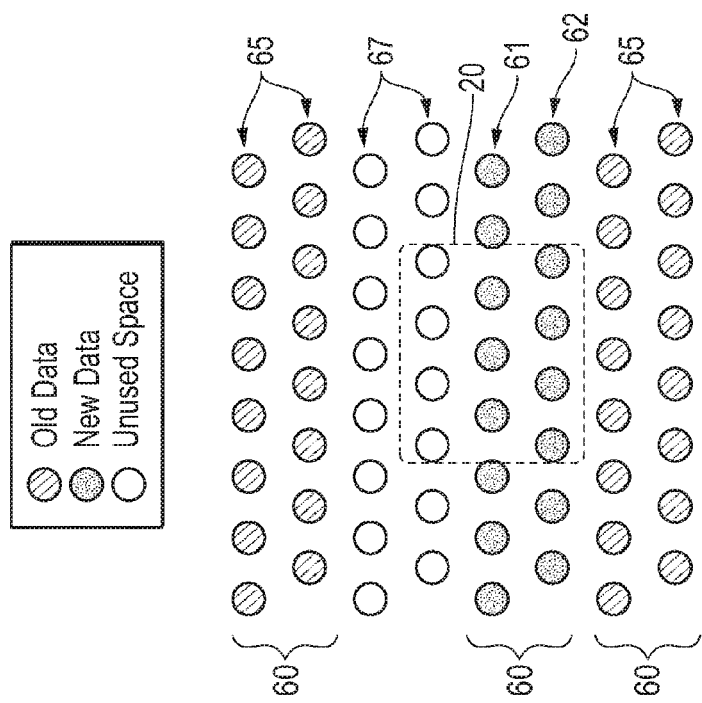

FIGS. 4A and 4B depict embodiments of EBM and SM architecture as applied to an application having hypertrack recording on a staggered lattice (e.g., triangular, parallelogram, etc.) of islands. See, e.g., U.S. Pat. App. Pub. 2008/0204915, which is incorporated herein by reference in its entirety. In hypertrack recording, the user data is grouped and written on two data tracks 41, 42 and the write head 20 writes data to both tracks 41, 42 simultaneously in a single pass. Although the example shows the hypertracks 40 in groups of two data tracks, other groupings may be employed to match the track layout with the width of the recording head.

When hypertrack recording is configured with an EBM architecture, the hypertracks that store user data are spaced by "half" of a hypertrack (i.e., one physical row or track of bits) for a head whose write width spans two hypertracks. The half-tracks 43, 44 serve as erase bands as described herein for other embodiments. Other hypertracks 40 comprising other data tracks 41, 42 and other erase bands 43, 44 also are shown. However, hypertracks with SM architecture can be configured in two different ways, depending on the head field properties at the edge of the write head. The basic mode is shown in FIG. 4B, in which only one track 51 (i.e., one half of a hypertrack) is written to per write pass. As described for other embodiments, SM writes data to every physical track in a shingled fashion so there are no erase bands, only unused space. For example, data may be written starting with the bottom track 52 and successively to each adjacent track 53, 54 from bottom to top. Thus, data tracks 52, 53, 54 were written to prior to track 51, which represents new data. Tracks 57 are unused data space that has not yet been written to in SM.

In some head-media systems (FIGS. 5A and 5B), a second type of shingled recording process may be employed in which two data tracks 61, 62 (i.e., a whole hyper track 60) are written to per pass. The ability of the head 20 to write two tracks 61, 62 per pass depends on the head field curvature and write misregistration margins. For example, hypertrack shingled mode writing on a staggered lattice (FIG. 5A) may be performed using a low curvature or substantially rectangular head 20. However, the head 20 of FIG. 5B has a higher curvature at taper 63 to perform hypertrack shingled mode writing on a rectangular lattice. Like other SM embodiments, these examples include old data tracks 65 and tracks 67 of unused space. The cross-track position of the head with respect to the written tracks may be adjusted appropriately to improve write fidelity.

Figure 6:
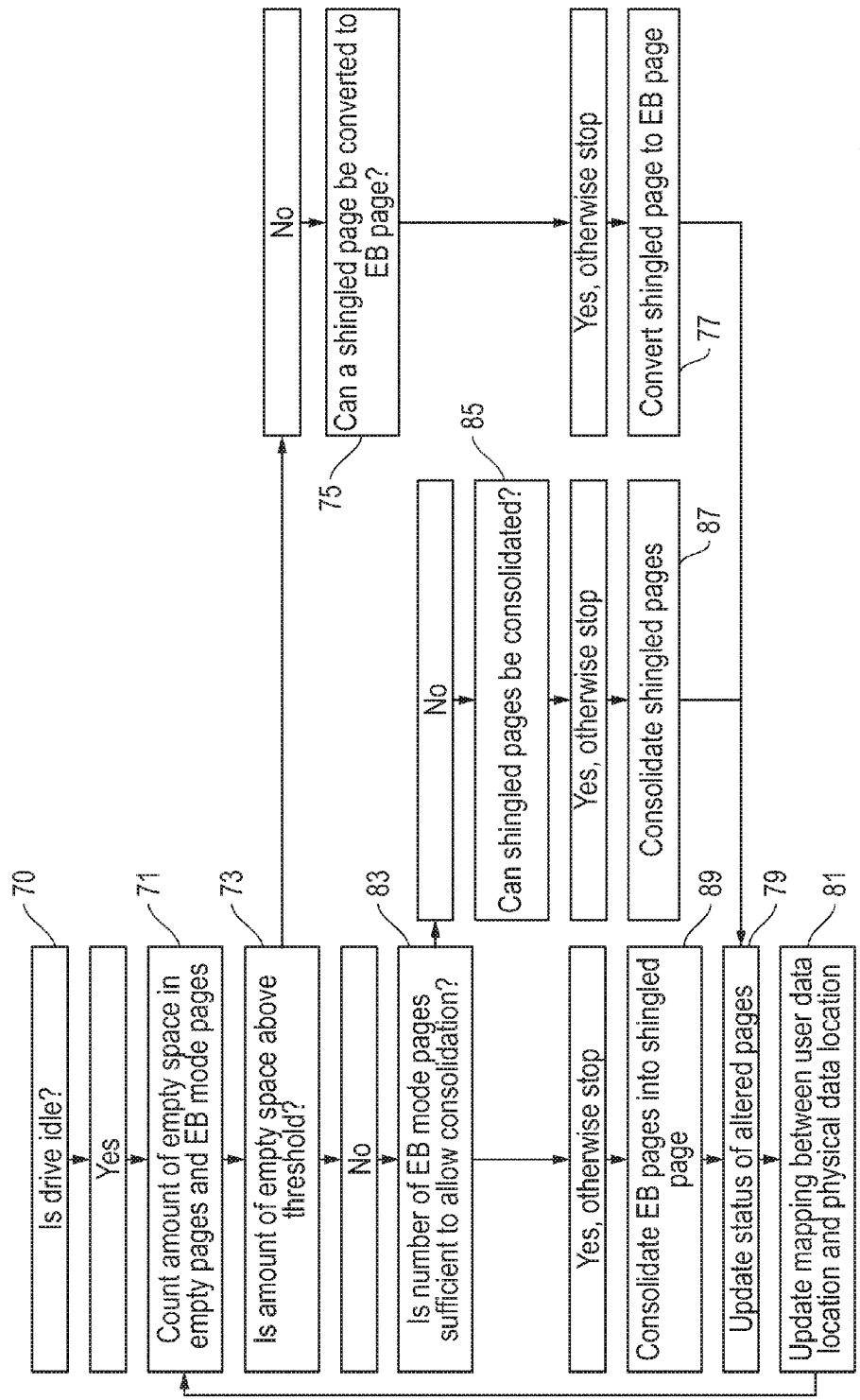
FIG. 6 is a high level flow diagram of one embodiment of a method for data track allocation.

FIG. 6 depicts an embodiment of a method for partitioning the tracks of useable storage space on a BPM disk into EBM and/or SM writing architectures. Physically, there is no difference between tracks used for each mode, and all tracks can be used for either mode. The disk drive need only account for how the disk space has been partitioned.

In some embodiments, data storage regions on the disk are grouped into units or pages as described previously herein for FIGS. 1A and 1B. The designation of a page to either EBM or SM is not fixed and can be changed. For example, the pages may be switched by considering how much free space remains in each type of page. In one embodiment, the disk drive considers how many empty pages remain on the drive. Once the number falls below a threshold, the drive starts converting EBM pages to SM pages. The conversion may include transferring valid user data in the EBM pages to existing SM pages or new empty pages that have been converted to SM pages. The specific SMR protocol for writing data to SM pages may vary. The empty EBM pages are designated as empty pages. The process may continue until the number of empty pages exceeds a predefined threshold.

In the example of FIG. 6, the method starts by inquiring whether the drive is idle (step 70) and, if so, the amount of empty space and number of EBM pages are counted (step 71). In this embodiment, the process does not reallocate pages if the drive is not idle. In other embodiments, however, the drive may perform these steps when it is not idle. For example, the method may occur during a sequence of write operations if the amount of available disk space falls below a critical threshold. If the amount of empty space is above a selected threshold (step 73), the drive assesses if the SM pages can be converted to EBM pages (step 75). If so, they are converted (step 77) and the status of the altered pages is updated (step 79). The method also updates mapping between user data location and the physical data location (step 81) before returning to step 71.

If the amount of empty space is not above a selected threshold (step 73), the method determines if the number of EBM pages is sufficient to allow consolidation (step 83). If not, the method determines if the SM pages can be consolidated (step 85) and consolidates them (step 87) if so, before returning to the updating step 79. If the number of EBM pages is sufficient to allow consolidation (step 83), the EBM pages are consolidated into SM pages (step 89), and the method returns to the updating step 79.

Figure 7:
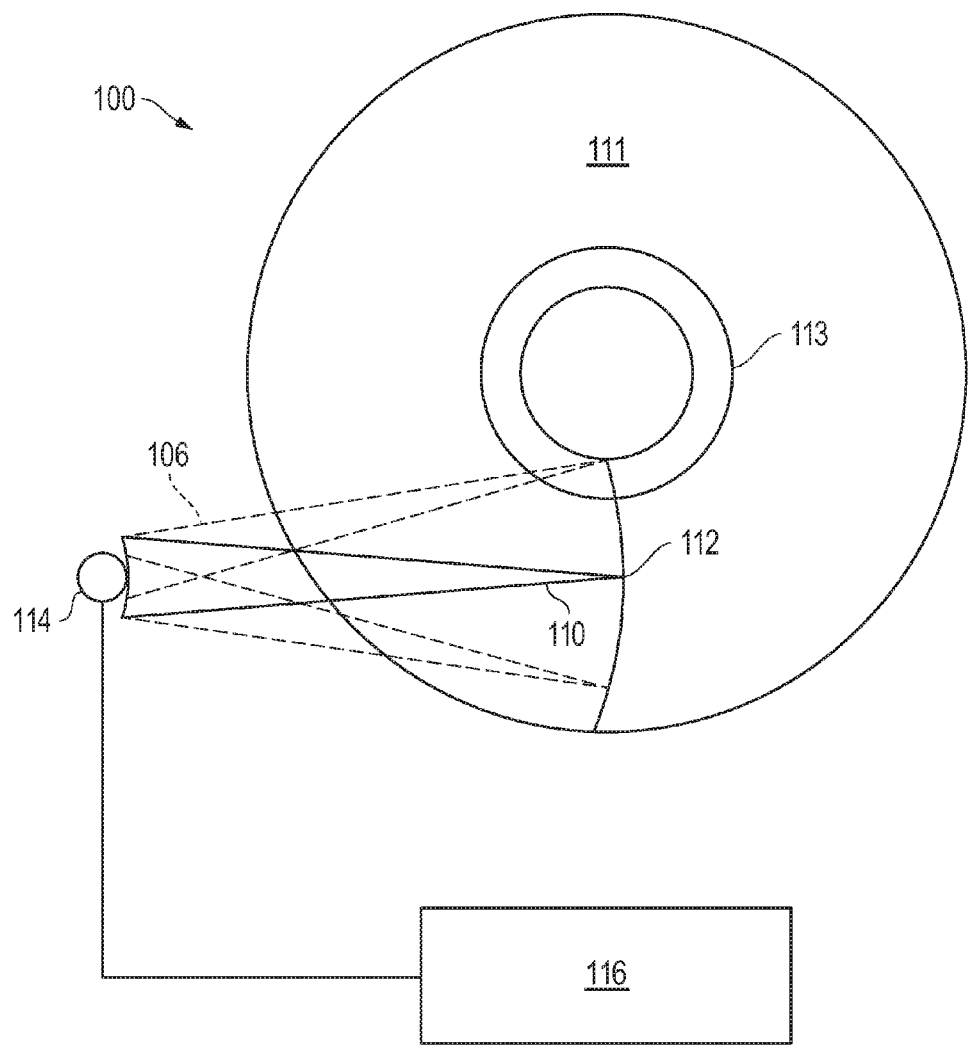
FIG. 7 is a schematic diagram of an embodiment of a disk drive.

FIG. 7 depicts a schematic diagram of an embodiment of a hard disk drive assembly 100. The hard disk drive assembly 100 generally comprises a housing or enclosure with one or more disks as described herein. The disk comprises magnetic recording media 111, rotated at high speeds by a spindle motor (not shown) during operation. The concentric data tracks 113 are formed on either or both disk surfaces magnetically to receive and store information.

Embodiments of a read or read/write head 110 may be moved across the disk surface by an actuator assembly 106, allowing the head 110 to read or write magnetic data to a particular track 113. The actuator assembly 106 may pivot on a pivot 114. The actuator assembly 106 may form part of a closed loop feedback system, known as servo control, which dynamically positions the read/write head 110 to compensate for thermal expansion of the magnetic recording media 111 as well as vibrations and other disturbances. Also involved in the servo control system is a complex computational algorithm executed by a microprocessor, digital signal processor, or analog signal processor 116 that receives data address information from a computer, converts it to a location on the media 111, and moves the read/write head 110 accordingly.

In some embodiments of hard disk drive systems, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 113 to another. Upon referencing a servo pattern, the read/write head 110 obtains head position information that enables the control circuitry 116 to subsequently realign the head 110 to correct any detected error.

Servo patterns may be contained in engineered servo sections 112 embedded within a plurality of data tracks 113 to allow frequent sampling of the servo patterns for improved disk drive performance, in some embodiments. In a typical magnetic recording media 111, embedded servo sections 112 extend substantially radially from the center of the magnetic recording media 111, like spokes from the center of a wheel. Unlike spokes however, servo sections 112 form a subtle, arc-shaped path calibrated to substantially match the range of motion of the read/write head 110.

In other embodiments, a hard disk drive comprises a disk having bit patterned media with a plurality of data tracks arrayed in architecture pages having at least one of erase band mode (EBM), shingled mode (SM) and unallocated space. An actuator has a head for writing data to the data tracks of the bit patterned media. A control system monitors, reallocates and reconfigures the architecture pages from EBM, SM or unallocated space to a different one of EBM, SM or unallocated space to enhance performance of the hard disk drive. Each of the architecture pages may comprise a group of adjacent data tracks spanning one or more sectors, and a write width of the head may span at least two data tracks.

In some embodiments, EBM stores data only on designated data tracks that are located at least a write width apart from each other, such that data tracks located between the designated data tracks form unused erase bands and are re-written every time an adjacent designated data track is written to. SM may make every data track available to store data and data is written sequentially on adjacent data tracks in successive order.

In other embodiments, the data tracks are arrayed in a hypertrack configuration, such as a rectangular or staggered lattice. Adjacent ones of the data tracks may be circumferentially offset from each other. The data tracks may be grouped and written to in sets of two data tracks such that the head writes data to both of said two data tracks simultaneously in a single pass. The hypertrack configuration with EBM may have hypertracks that store data and are spaced apart from adjacent hypertracks by single data tracks that form unused erase bands. The hypertrack configuration with SM may write only one data track per write pass. SM may make every data track available to store data and data is written sequentially on adjacent data tracks in successive order. The hypertrack configuration with SM may write two data tracks write pass. The data tracks may be arrayed in a staggered lattice and the head has a low curvature so that only one bit is written to at a time. The data tracks also may be arrayed in a rectangular lattice and the head has a high curvature so that only one bit is written to at a time.

In still other embodiments, a method of partitioning data tracks on a disk of bit patterned media in a hard disk drive comprises providing the disk with pages having a storage architecture of at least one of erase band mode (EBM), shingled mode (SM) and empty space; counting an amount of empty space and a number of EBM pages; assessing if the amount of empty space is above a selected threshold and, if so, assessing if any SM pages can be converted to EBM pages; converting SM pages to EBM pages; updating a status of converted pages and mapping between a user data location and a physical data location before returning to the counting step; determining if the number of EBM pages is sufficient to allow consolidation if the amount of empty space is not above the selected threshold; consolidating SM pages and returning to the updating step; consolidating the EBM pages into SM pages if the number of EBM pages is sufficient to allow consolidation; and returning to the updating step. These steps may be performed when the hard disk drive is idle or during writing operations. Other embodiments may comprise other steps, features and elements previously described herein.

In still another embodiment, a method of partitioning data tracks on a disk of bit patterned media in a hard disk drive comprises organizing the disk into pages of adjacent data tracks spanning one or more sectors; partitioning the pages into storage architectures comprising erase band mode (EBM), shingled mode (SM) and empty space; monitoring whether the pages are being written to in EBM, SM, or are empty pages; changing the storage architecture of at least one page based on how much empty space remains in said at least one page; converting EBM pages to SM pages when a storage threshold is exceeded; and transferring valid user data from EBM pages to SM pages or to empty pages that have been converted to SM pages.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. The order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A hard disk drive, comprising:
   a disk having bit patterned media with a plurality of data tracks arrayed in architecture pages having at least one of erase band mode (EBM), shingled mode (SM) and unallocated space;
   an actuator having a head for writing data to the data tracks of the bit patterned media; and
   a control system that monitors, reallocates and reconfigures the architecture pages from EBM, SM or unallocated space to a different one of EBM, SM or unallocated space to enhance performance of the hard disk drive.

2. A hard disk drive according to claim 1, wherein each of the architecture pages comprises a group of adjacent data tracks spanning one or more sectors.

3. A hard disk drive according to claim 1, wherein a write width of the head spans at least two data tracks.

4. A hard disk drive according to claim 1, wherein EBM stores data only on designated data tracks that are located at least a write width apart from each other, such that data tracks located between the designated data tracks form unused erase bands and are re-written every time an adjacent designated data track is written to.

5. A hard disk drive according to claim 1, wherein SM makes every data track available to store data and data is written sequentially on adjacent data tracks in successive order.

6. A hard disk drive according to claim 1, wherein the data tracks are arrayed in a hypertrack configuration.

7. A hard disk drive according to claim 6, wherein the data tracks collectively form a rectangular or staggered lattice.

8. A hard disk drive according to claim 6, wherein adjacent ones of the data tracks are circumferentially offset from each other.

9. A hard disk drive according to claim 6, wherein the data tracks are grouped and written to in sets of two data tracks such that the head writes data to both of said two data tracks simultaneously in a single pass.

10. A hard disk drive according to claim 6, wherein the hypertrack configuration with EBM has hypertracks that store data and are spaced apart from adjacent hypertracks by single data tracks that form unused erase bands.

11. A hard disk drive according to claim 6, wherein the hypertrack configuration with SM writes only one data track per write pass.

12. A hard disk drive according to claim 11, wherein SM makes every data track available to store data and data is written sequentially on adjacent data tracks in successive order.

13. A hard disk drive according to claim 6, wherein the hypertrack configuration with SM writes two data tracks write pass.

14. A hard disk drive according to claim 13, wherein the data tracks are arrayed in a staggered lattice and the head has a low curvature so that only one bit is written to at a time.

15. A hard disk drive according to claim 13, wherein the data tracks are arrayed in a rectangular lattice and the head has a high curvature so that only one bit is written to at a time.

\* \* \* \* \*